(12) United States Patent
Kamoi

(10) Patent No.: US 9,280,728 B2
(45) Date of Patent: Mar. 8, 2016

(54) IMAGE FORMING APPARATUS, CONTROL METHOD, AND PROGRAM

(71) Applicant: CANON KABUSHIKI KAISHA, Tokyo (JP)

(72) Inventor: Keiko Kamoi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/096,886

(22) Filed: Dec. 4, 2013

(65) Prior Publication Data

US 2014/0160523 A1   Jun. 12, 2014

(30) Foreign Application Priority Data

Dec. 11, 2012 (JP) ................................. 2012-270520

(51) Int. Cl.
| | |
|---|---|
| *G06K 15/02* | (2006.01) |
| *H04N 1/00* | (2006.01) |
| *G03G 15/00* | (2006.01) |
| *G06K 15/00* | (2006.01) |

(52) U.S. Cl.
CPC .......... *G06K 15/027* (2013.01); *H04N 1/00015* (2013.01); *H04N 1/00031* (2013.01); *H04N 1/00053* (2013.01); *H04N 1/00063* (2013.01); *H04N 1/00087* (2013.01); *H04N 1/00915* (2013.01); *G06K 15/4045* (2013.01); *H04N 2201/0036* (2013.01); *H04N 2201/0087* (2013.01); *H04N 2201/0091* (2013.01)

(58) Field of Classification Search
CPC .................................. G06K 15/027; H04N 1/00
See application file for complete search history.

(56) References Cited

U.S. PATENT DOCUMENTS

| | | | | |
|---|---|---|---|---|
| 7,304,753 | B1 * | 12/2007 | Richter ................. | G06F 3/1204 358/1.14 |
| 7,415,215 | B2 * | 8/2008 | Yamada ......................... | 399/38 |
| 2004/0258445 | A1 * | 12/2004 | Fujimaki et al. ................ | 400/76 |
| 2005/0117926 | A1 * | 6/2005 | Tanaka et al. .................... | 399/49 |
| 2007/0070460 | A1 * | 3/2007 | Yamada ........................ | 358/504 |
| 2008/0291483 | A1 * | 11/2008 | Shimatani ............. | G06F 3/1204 358/1.15 |
| 2009/0184947 | A1 * | 7/2009 | Hupman .................. | G09G 5/02 345/207 |
| 2010/0277764 | A1 * | 11/2010 | Yamazaki .................... | 358/1.15 |

FOREIGN PATENT DOCUMENTS

| | | |
|---|---|---|
| JP | 2000-190573 A | 11/2000 |
| JP | 2000-190573 A5 | 2/2006 |
| JP | 2006-62197 A | 9/2006 |

* cited by examiner

*Primary Examiner* — Marivelisse Santiago Cordero
*Assistant Examiner* — Daryl Jackson
(74) *Attorney, Agent, or Firm* — Fitzpatrick, Cella, Harper & Scinto

(57) ABSTRACT

While calibration is being executed in an image forming apparatus, it is not possible to execute printing until the calibration is completed, and therefore, usability of a user is poor. An image forming apparatus including Media Direct Print function to print data stored in a portable storage medium. The image forming apparatus includes a connection detection unit configured to detect connection of the portable storage medium and a control unit configured to control calibration from being executed in response to the connection detection unit detecting the connection of the portable storage medium.

12 Claims, 10 Drawing Sheets

```
PROCEDURE (TO START, PRESS OK)

1. PRINT CORRECTED IMAGE 1
2. SCAN CORRECTED IMAGE 1
3. PRINT CORRECTED IMAGE 2
4. SCAN CORRECTED IMAGE 2

OK                        ─601
```

```
USABLE SHEET

SIZE: A4, LTR
TYPE: PLAIN SHEET

PROCEDURE (TO START, PRESS OK)

1. PRINT CORRECTED IMAGE 1
2. SCAN CORRECTED IMAGE 1
3. PRINT CORRECTED IMAGE 2
4. SCAN CORRECTED IMAGE 2

USABLE SHEET

SIZE: A4, LTR

TYPE: PLAIN SHEET

PROCEDURE 1

CORRECTED IMAGE 1 IS BEING PRINTED

IMAGE FORMING APPARATUS, CONTROL METHOD, AND PROGRAM

BACKGROUND OF THE INVENTION

1. Field of the Invention

The present invention relates to control of calibration in an image forming apparatus.

2. Description of the Related Art

In an image forming apparatus, such as a color laser beam printer and a copying machine, it is necessary to periodically perform adjustment of a printing process in order to maintain, improve, and stabilize image quality. As a phenomenon in which deterioration of image quality surfaces, for example, mention is made of a change in toner density in a color machine. Even in the case where all the toner of four colors of CMYK is specified to the same density (gradation value), the color density changes due to various causes, such as the external environments of temperature, humidity, etc., and deterioration of the drum. As a result of that, the image output result becomes unstable. The function to correct this is called gradation correction. The four-drum type laser beam printer and the copying machine having a photoconductor drum for each color have the bending characteristics for the drum drawing by beams, and therefore, there also occurs a phenomenon in which the print position deviates for each color. The function to correct this is color deviation correction.

Normally, settings are performed so that the above-described gradation correction and color deviation correction (hereinafter, referred to as "calibration") are automatically executed periodically with an appropriate timing, such as after a fixed time elapses and after a fixed number of sheets is subjected to processing, in order to keep constant the image quality of an image to be printed. For example, calibration is executed automatically at a frequency, such as once after 12 hours elapse and once after 200 sheets are printed.

However, depending on the product type, there is a case where one-time calibration requires several minutes. While calibration is being executed, processing, such as printing and copying, cannot be executed and a user needs to wait until the execution of calibration is completed. Further, there may be a case where the execution of calibration occurs incidentally while printing is being executed (for example, at the time of the completion of printing of one of five sheets). In such a case also, a user needs to wait for several minutes until the execution of calibration is completed. This is inconvenient to the user and improvement in the situation where the user's operation is blocked by the automatic execution of calibration is demanded frequently in the market.

Conventionally, in order to avoid such a problem, it is proposed to control the execution timing of calibration.

For example, Japanese Patent Laid-Open No. 2000-190573 discloses the technique to guarantee that calibration is not executed on transmitted data by transmitting a flag indicating whether calibration can be executed or not together with print data.

Further, Japanese Patent Laid-Open No. 2006-062197 discloses the technique to control the calibration timing in accordance with the type of printing or in response to the request of a user.

In the above-described prior art, each user can set whether or not the execution of calibration is necessary depending on the contents of the print job, and therefore, it is possible to prevent the waiting time due to calibration from occurring. However, to do so, a user is required to perform another setting operation, and therefore, it takes time and effort and the possibility is strong that a user who is not familiar with calibration does not use the setting item even in the case where it is provided. Further, conventionally, there exist a number of control methods for giving priority to the execution of print job over the execution of calibration, however, most of the methods are those which suppress the execution of calibration for a specific job by, for example, giving conditions under which calibration can be executed or not to the print data and the job attribute.

Because of this, in the prior art, it is difficult to say that the execution of calibration can be suppressed securely while a user is performing an operation for printing through the UI. For example, there is a case where calibration is executed because a PC print job or FAX print job is requested and printing is executed while a user is performing printing settings etc. on the UI screen for copying or Media Direct Print, and the printing processing originally intended is postponed. (The Media Direct Print function is a technique to print an image or document file stored in a portable storage medium, such as an SD card and USB memory.)

Particularly, at the time of the use of the Media Direct Print function, the operation time on the UI tends to lengthen compared to other functions because the file browse etc. is performed. Further, there is a case where some product types include the function by which it is possible to give printing instructions for each image while checking the image by the preview display, for example, the function by which it is possible to "print while viewing the image". In the case where the Media Direct Print function like this is used, a user does not necessarily give printing instructions at one time for files to be printed and there is a case where a user gives printing instructions in a plurality of times (a plurality of times of pressing of the start key). As a result of that, the possibility becomes strong that the operation is interrupted by the execution of calibration, however, it is not possible for the above-described prior art to deal with such a problem.

SUMMARY OF THE INVENTION

The image forming apparatus according to the present invention is an image forming apparatus including the Media Direct Print function to print data stored in a portable storage medium, and the image forming apparatus includes a connection detection unit configured to detect connection of the portable storage medium and a control unit configured to control calibration from being executed in response to the connection detection unit detecting the connection of the portable storage medium.

According to the present invention, it is possible to prevent a situation where a user who is using the image forming apparatus is made to wait because of the unwanted execution of calibration.

Further features of the present invention will become apparent from the following description of exemplary embodiments (with reference to the attached drawings).

BRIEF DESCRIPTION OF THE DRAWINGS

FIGS. 6A to 6C are diagrams showing an example of a UI screen used at the time of executing manual calibration;

DESCRIPTION OF THE EMBODIMENTS

Hereinafter, embodiments for executing the present invention are explained using the drawings.

First Embodiment

Figure 1:
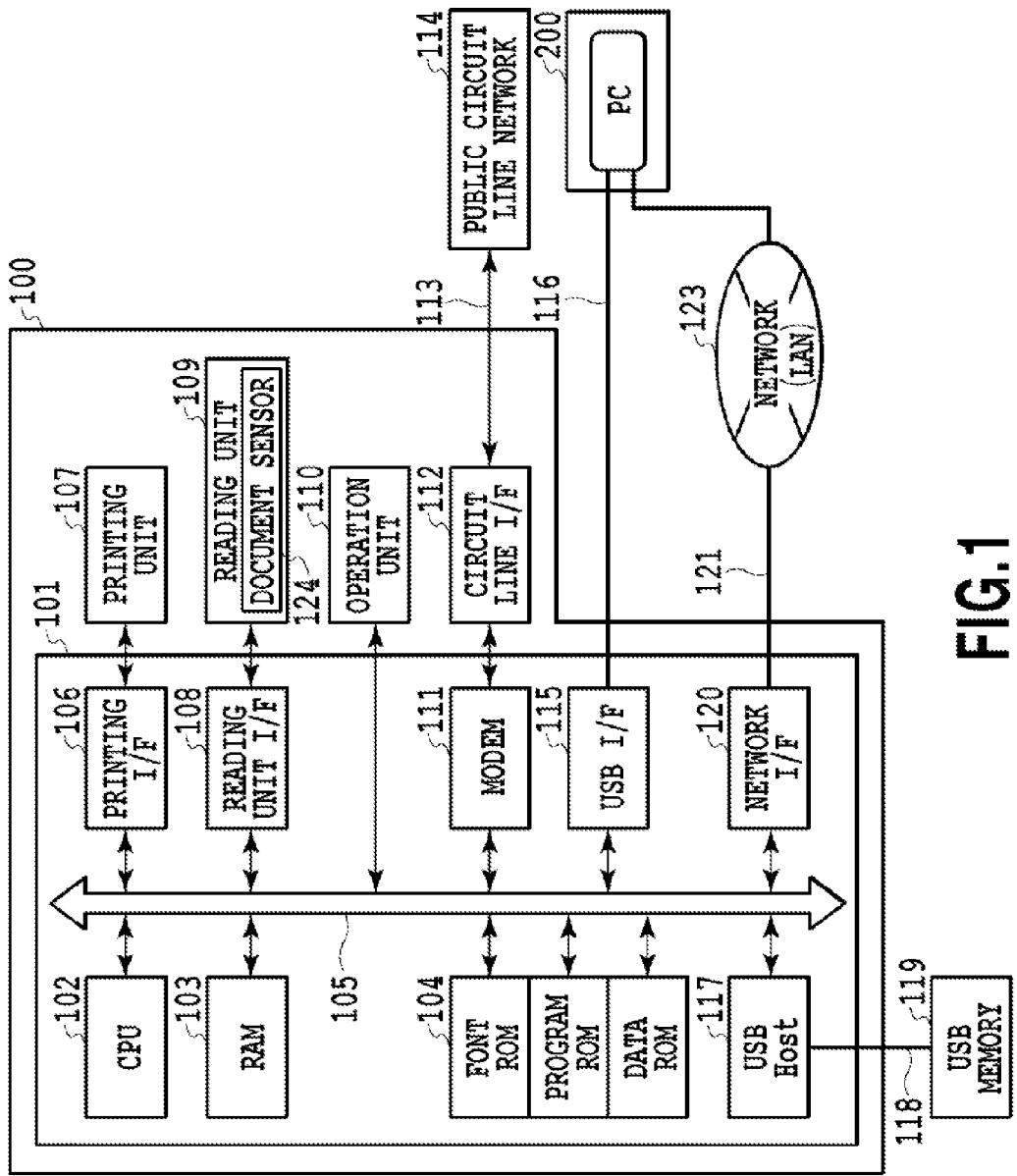
FIG. 1 is a block diagram showing a hardware configuration of an image forming apparatus according to a first embodiment.

FIG. 1 is a block diagram showing a hardware configuration of an image forming apparatus according to the present embodiment. Each block shows a module and an arrow between blocks shows a flow of data or instructions.

An image forming apparatus 100 includes a printing unit 107, a reading unit 109, an operation unit 110, a circuit line I/F 112, and a control unit 101 configured to control each unit.

The control unit 101 includes a CPU 102, a RAM 103, a ROM 104, a printing unit I/F 106, a reading unit I/F 108, a MODEM 111, a USB I/F 115, a USB Host 117, and a network I/F 120. These blocks are connected by a system bus 105. The CPU 102 totally controls each block in accordance with various kinds of control programs. The various kinds of control programs are executed by the CPU 102 reading control programs stored in a program area of the ROM 104 (program ROM). Alternatively, they are executed by decompressing and developing compressed data stored in the program area of the ROM 104 onto the RAM 103. It may also be possible to store the previously-described various kinds of control programs in a hard disc drive (HDD), not shown schematically, in the compressed state or in the non-compressed state. Further, there is included a login detection unit (not shown schematically) configured to detect that a user has logged in to the image forming apparatus 100.

The network I/F 120 executes communication processing with a host computer 200 (in FIG. 1, written as PC) via a network (LAN etc.). The network I/F 120 and a network 123 are connected by a communication cable, such as a LAN cable 121. The MODEM 111 connects with a public circuit line network 114 via the circuit line I/F 112 and executes processing to communicate with another image forming apparatus, facsimile device, telephone, etc., not shown schematically. The circuit line I/F 112 and the public circuit line network 114 are connected generally by a telephone line 113 etc.

The printing unit I/F 106 functions as an interface through which an image signal is output to the printing unit 107 (printer engine). The reading unit I/F 108 functions as an interface through which an image reading signal from the reading unit 109 (scanner engine) is input. The image reading signal is acquired by an image sensor (not shown schematically), such as a CCD, provided at a document mounting unit or ADF (automatic document feeder) made of a transparent glass plate. The ADF includes a document tray on which a plurality of documents can be stacked. The document tray of the document mounting unit and ADF is provided with a document sensor (document detection unit) 124, such as a photosensor, configured to detect a document that is set. The CPU 102 processes the image reading signal input from the reading unit 109 via the reading unit I/F 108 and outputs it as an image recording signal to the printing unit I/F 106.

The USB I/F 115 executes processing to communicate with the host computer 200 via a USB cable 116 etc.

The USB Host 117 is an interface for connecting various kinds of peripherals in conformity with the USB standards and is connected with a USB memory 119 as a portable storage medium via a USB connector 118. Image files etc. within the USB memory 119 are read via the USB Host 117. The USB memory is an example of the portable storage medium and it is needless to say that the interface changes in accordance with the change of the type of the storage medium to be used.

The CPU 102 displays characters and symbols on the display unit of the operation panel 110 by using font information stored in a font area of the ROM 104 (font ROM) and receives operation instructions from a user via the operation panel 110.

In a data area of the ROM 104 (data ROM), apparatus information of the image forming apparatus 100, user's telephone directory information, division management information, etc., are stored by the CPU 102 and they are read and updated in accordance with necessity by the CPU 102.

Here, the configuration is assumed to be one in which the reading unit 109 is located inside the image forming apparatus 100, however, the configuration may be one in which the reading unit 109 is located outside the image forming apparatus 100.

Figure 2:
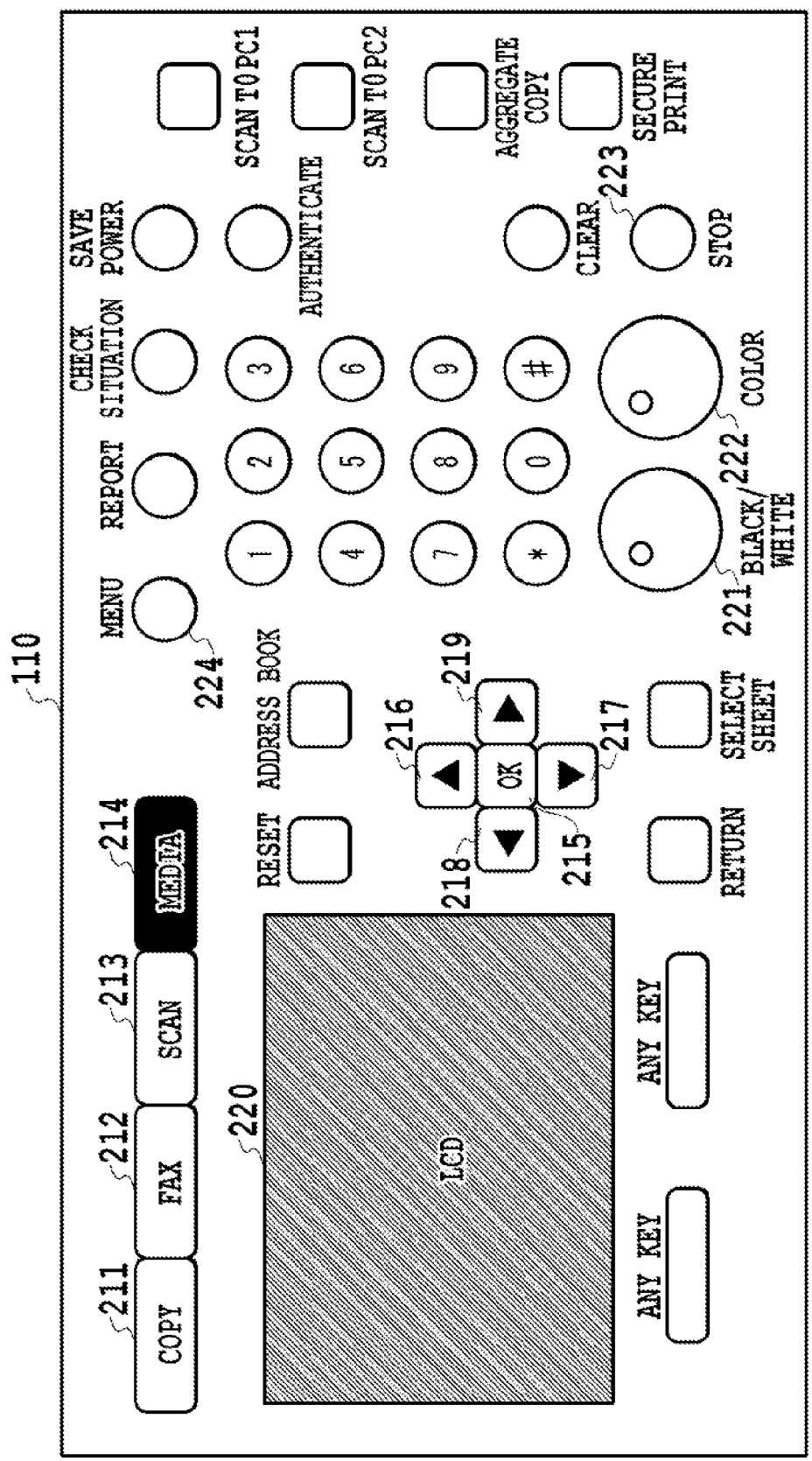
FIG. 2 is a diagram showing an example of an operation panel.

FIG. 2 is a diagram showing a configuration example of an operation panel as the operation unit 110.

Reference numerals 211 to 214 denote function keys corresponding to each of "Copy", "FAX", "Scan", and "Media" functions, respectively. In response to pressing any of these keys, the screen transits to a start screen of the function corresponding to the pressed key. For example, the function key of the selected function lights up so as to indicate that the function is currently selected. In FIG. 2, the state where the Media function key 214 is selected is indicated by outline letters and in the case where a Black/white printing start key 221 or a Color printing start key 222 is pressed in this state, the Media Direct Print job is executed as a result.

Reference numeral 215 denotes an OK key and it is used to select an item. Reference numerals 216 to 219 denote upward, downward, leftward, and rightward arrow keys, respectively, and they are used to move between items. Reference numeral 220 denotes an LCD and it displays various kinds of screens.

Reference numeral 221 denotes the Black/white printing start key to give instructions to execute black and white printing and reference numeral 222 denotes the Color printing start key to give instructions to execute color printing. Each of the start keys lights up in the state where it can be pressed.

Reference numeral 223 denotes a Stop key and it is used to stop a job etc. Reference numeral 224 denotes a Menu key and it is possible to perform the initial setting of various kinds of functions, the network setting, the security setting, the timer setting, etc. Manual calibration can also be executed through the Menu key denoted by 224.

Figure 3A:
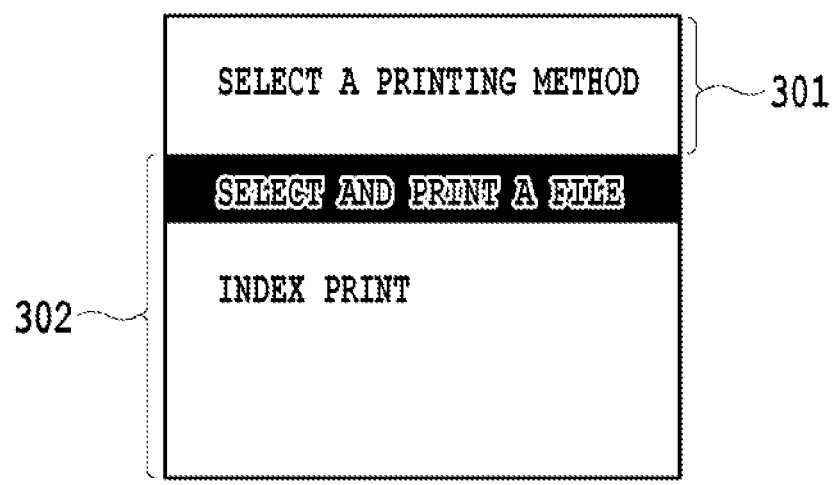
FIGS. 3A and 3B are examples of a display screen displayed at the time of the use of the Medium Direct Print function.
Figure 3B:
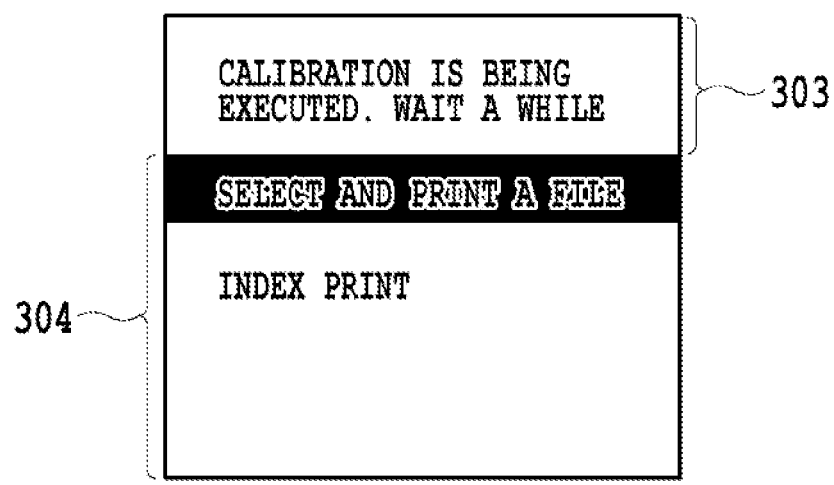

FIGS. 3A and 3B are examples of the start screen displayed at the time of the use of the Media Direct Print function, and FIG. 3A is the start screen at the normal time and FIG. 3B is the start screen at the time of the execution of calibration.

The start screen 3A at the normal time is displayed on the LCD 220 of the operation panel 110 in response to pressing the Media function key 214. Then, in a status display area 301 in the screen, a message "Select a printing method." to prompt a user to select a printing method is displayed and a state where printing can be executed is shown. Further, in a printing method display area 302 in the screen, printing method candidates (here, two types of candidates, "Select and print a file." and "Index print") are displayed. Then, in the case where the OK key 215 is pressed in the state where either of the printing methods is selected in the printing method display area 302, the start screen transits to a file browse screen, not shown schematically.

The start screen 3B at the time of the execution of calibration is displayed in response to the start of the execution of calibration while the Media Direct Print function is being used. In a status display area 303 in the screen, a message "Calibration is being executed. Wait a while." indicating that calibration is being executed is displayed in a repeated manner.

Figure 4A:
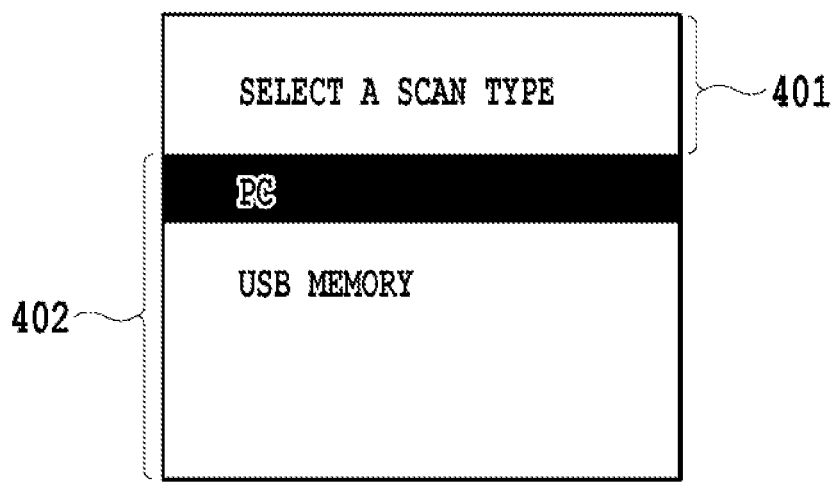
FIGS. 4A and 4B are examples of a display screen displayed at the time of the use of a scan function.
Figure 4B:
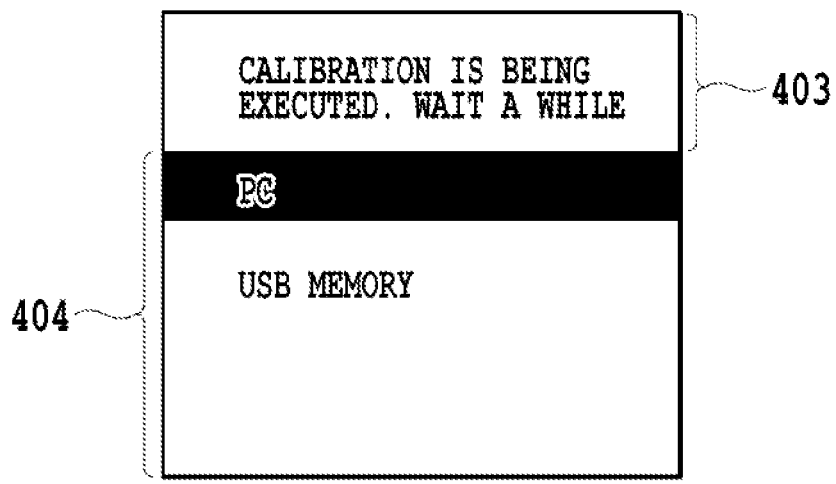

FIGS. 4A and 4B are examples of the start screen displayed at the time of the use of the scan function. This screen is displayed on the LCD 220 of the operation panel 110 in response to pressing the Scan function key 213. In a status display area 401 in the screen, a message "Select a scan type." to prompt a user to select a scan type is displayed and a state where scan can be performed currently is shown. In a scan type display area 402 in the screen, scan types that can be selected (here, two scan types, "PC" and "USB memory") are displayed. Then, in the case where the OK key 215 is pressed, the start screen transits to one of various kinds of scan setting detail screens, not shown schematically.

Figure 5A:
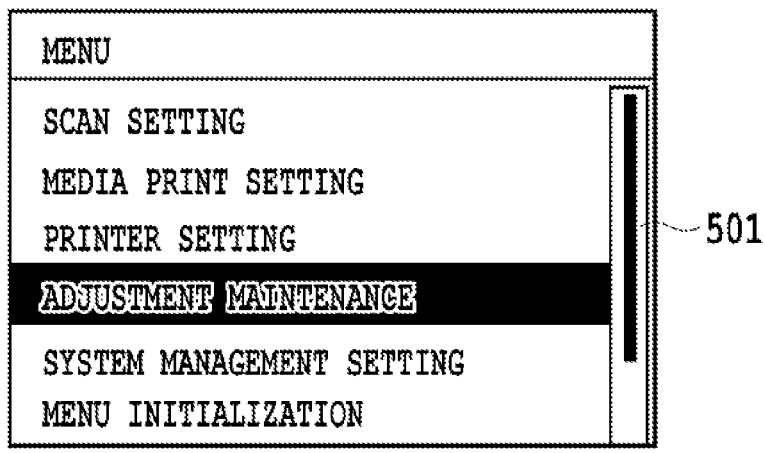
FIGS. 5A to 5C are examples of a display screen at the time of executing manual calibration.
Figure 5B:
Figure 5B:
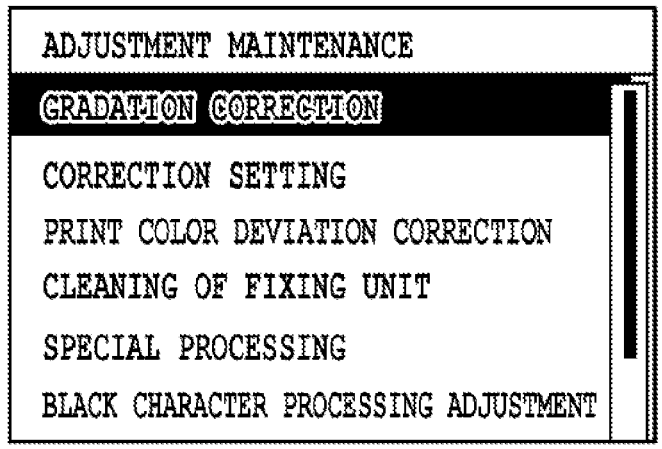
Figure 5C:
Figure 5C:
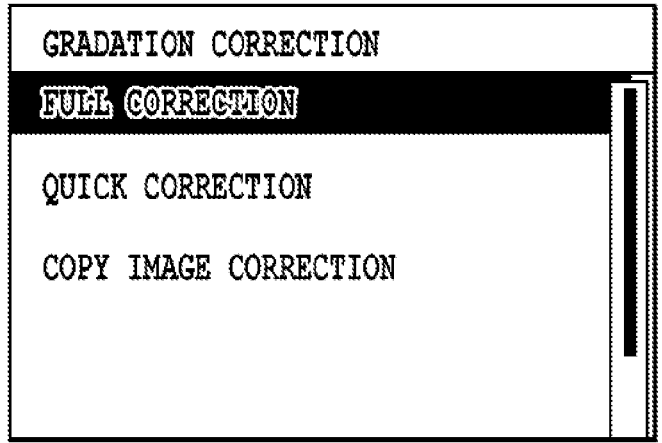

FIGS. 5A to 5C each show a UI screen used at the time of the execution of manual calibration. FIG. 5A is a Menu screen and this screen is displayed on the LCD 220 in response to pressing the Menu key 224. In the Menu screen, various kinds of items, such as Scan setting, Media Print setting, Printer setting, Adjustment maintenance, System management setting, Menu initialization, Network setting/security setting, and Timer setting, are displayed in a list. In the Menu screen in FIG. 5A, the items of Network setting/security setting and Timer setting are not displayed, and in the case where there are some items that cannot be displayed within the screen as described above, a scroll bar 501 is displayed at the right end. The portion displayed by outline characters in the screen (here, "Adjustment maintenance") indicates the item currently selected. FIG. 5B is an example of the Adjustment maintenance screen displayed in the case where "Adjustment maintenance" is selected in the Menu screen in FIG. 5A. Items of the maintenance function are displayed in a list and in the case where the gradation correction and color deviation correction previously described are executed manually, these items are selected. In addition to these, items relating to various kinds of adjustment/maintenance, such as Cleaning of fixing unit and Black character processing adjustment, are displayed. The portion displayed by the outline characters in the screen (here, "Gradation correction") shows the item currently selected.

FIG. 5C is an example of a Gradation correction detail setting screen displayed in the case where "Gradation correction" is selected in the Adjustment maintenance screen in FIG. 5B. As the contents of Gradation correction, each item of Full correction, Quick correction, Copy image correction is displayed in a list. Full correction is the function to correct the print density by applying four kinds of gradation images (patch) by printing a predetermined color patch on a sheet and reading it with a scanner. The data in the best state of color printing in the image forming apparatus is registered, and therefore, a service person executes this first at the time of the delivery of the image forming apparatus to a client. In contrast to this, Copy image correction (copier correction) is the function to correct the print density by applying only two kinds of gradation images. Quick correction is the function to acquire an amount of adjustment for achieving the most appropriate state in the present situation in order to keep constant the gradation characteristics of an image output from the image forming apparatus based on the current color state and the gradation characteristics obtained by Full correction. Each correction is executed by pressing the OK key 215 in the state where each correction is selected.

The calibration executed in accordance with the procedure described above is called manual calibration because it is executed based on instructions from a user. The manual calibration is distinguished from automatic calibration executed independently of the intention of a user. The automatic calibration is executed automatically in the case where predetermined conditions set in advance and which a user cannot change are fulfilled, such as with the timing of the exchange of toner cartridges, the timing of the elapse of a predetermined time, and the timing of the completion of printing of a predetermined number of sheets. In the automatic calibration, the color patch is not printed on a sheet but is output onto an intermediate transfer belt (not shown schematically) within the printing unit and by using the measurement result of the color patch measured by a sensor (not shown schematically) within the printing unit, the reproduction characteristics of an image output from the image forming apparatus 100 are corrected. That is, it is not necessary for a user to perform the task to place the color patch output on a sheet on the reading unit 109. In the present embodiment, the execution of the automatic calibration is postponed under certain conditions.

FIGS. 6A to 6C are each an example of a popup screen displayed on the LCD 220 at the time of the execution of manual calibration. Here, the case where Full correction described above is executed is explained as an example.

In the case where the OK key 215 is pressed in the state where "Full correction" is selected in the Gradation correction detail setting screen in FIG. 5C described previously, the popup screen shown in FIG. 6A indicating the procedure of the manual calibration is displayed on the LCD 220. In response to a user pressing an OK button 601 located at the bottom of the screen in FIG. 6A, the calibration is executed in order from the procedure 1 and the popup screen for prompting the user to make a check and give instructions is displayed for each procedure. For example, in the procedure 1, the popup screen shown in FIG. 6B is displayed and the user is prompted to check the sheet to be used for printing of the color patch. Then, in the case where the user presses an OK button 602 located at the bottom of the screen in FIG. 6B, the popup screen shown in FIG. 6C is displayed. After the calibration starts once, the screen cannot transit to another screen while the calibration is being executed. That is, during the period of execution of calibration, a job accompanied by the panel operation can no longer be executed. Further, even a print job accompanied by no panel operation, such as PC print and FAX print, is not subjected to processing while calibration is being executed and printing is executed after the calibration is completed.

Figure 7:
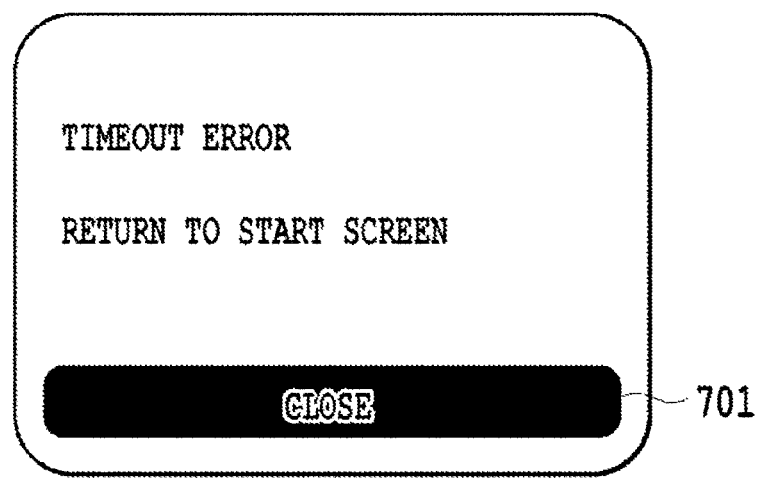
FIG. 7 is an example of a popup screen displayed at the time of the occurrence of a timeout error while the Media Direct Print function is being used.

FIG. 7 is an example of the popup screen displayed at the time of the occurrence of a timeout error while the Media Direct Print function is being used. In response to pressing a Close button 701 after pressing the OK key 215, the start screen of Media Direct Print (FIG. 3A) is displayed on the LCD 220. It is not necessarily required to display such a popup screen at the time of the occurrence of a timeout error and the configuration may be such that, for example, the screen returns to the start screen of Media Direct Print immediately.

Figure 8:
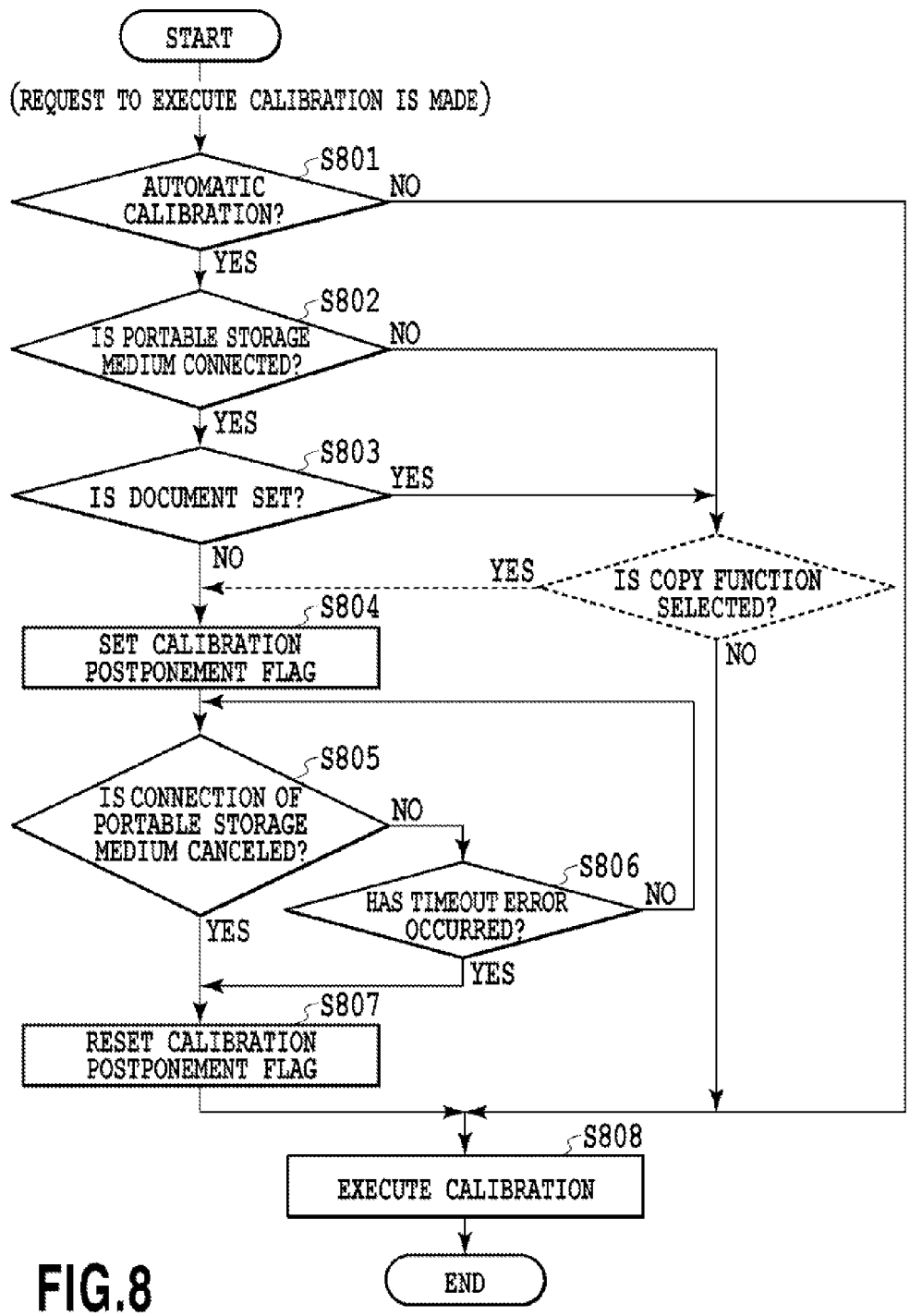
FIG. 8 is a flowchart showing a flow of calibration control processing according to the first embodiment.

FIG. 8 is a flowchart showing a flow of calibration control processing according to the present embodiment. In the following calibration control processing, whether or not calibration can be executed is determined by taking into consideration the contents of the job in conflict with the calibration. The series of processing is implemented by the CPU 102 executing a computer executable program in which the procedure shown below is described after reading the program from the ROM 104 etc. onto the RAM 103.

As described previously, the calibrations include the manual calibration executed based on the user's instructions from the operation panel and the automatic calibration executed automatically in the case where preset conditions are fulfilled. Consequently, in the case where a request to execute calibration is made, the control unit 101 determines whether the calibration requested to be executed is the automatic calibration or the manual calibration at step 801. In the case where it is determined that the request is to execute the automatic calibration, the procedure proceeds to step 802. On the other hand, in the case where it is determined that the calibration is the manual calibration, the procedure proceeds to step 808 and the calibration is executed immediately. This is because the instructions to execute calibration given intentionally by the user are subjected to processing preferentially.

At step 802, the control unit 101 determines whether a portable storage medium, such as a USB memory, is connected. In the case where a portable storage medium is connected, the control unit 101 determines that there is a possibility that the Media Direct Print function is used and the procedure proceeds to step 803. On the other hand, in the case where no portable storage medium is connected, the control unit 101 determines that there is no possibility that the Media Direct Print function is used (the possibility that a user is in front of the image forming apparatus is faint) and the procedure proceeds to step 808 so that the calibration is executed immediately.

At step 803, the control unit 101 determines whether there is a document (whether a document is set) on the reading unit 109. In the case where it is determined that a document is set, the control unit 101 concludes that the possibility that a Scan To Media function accompanied by no printing processing is used is strong, and the procedure proceeds to step 808 so that the automatic calibration is executed immediately. On the other hand, in the case where it is determined that no document is set, the control unit 101 concludes that the possibility that the Media Direct Print function accompanied by printing processing is used is strong, and the procedure proceeds to step 804 so that the execution of automatic calibration is postponed.

At step 804, the control unit 101 sets a flag to postpone the execution of automatic calibration (hereinafter, referred to as a "postponement flag") to a job to be output and postpones the execution of automatic calibration until any of the conditions to be described later is fulfilled. Due to this, a user is no longer made to wait for the execution of printing because calibration is being executed. With the timing of the setting of the postponement flag, the time count is started to provide a reference for the determination of a timeout error, to be described later. Although not shown in the flowchart in FIG. 8, it may also be possible to set an automatic calibration postponement flag to a job to be output in response to a login detection unit detecting that a user has logged in to the image forming apparatus 100, as at step 804.

At step 805, the control unit 101 determines whether the connection of the portable storage medium is canceled (for example, whether that the USB memory is pulled out from the USB port is detected). In the case where the connection of the portable storage medium is canceled, the procedure proceeds to step 807. On the other hand, in the case where the connection of the portable storage medium is not canceled, the procedure proceeds to step 806.

At step 806, the control unit 101 determines whether a timeout error has occurred. Specifically, in the case where a predetermined time (for example, 10 minutes) elapses after the start of the above-described time count, and during which there is no input of the operation of a user to the various kinds of screens or operation buttons displayed at the time of the use of the Media Direct Print function, it is determined as a result that a timeout error has occurred. It may also be possible to enable a user to freely set and change the predetermined time. In the case where a timeout error has occurred, the procedure proceeds to step 807. On the other hand, in the case where no timeout error has occurred, the procedure returns to step 805.

At step 807, the control unit 101 resets the calibration postponement flag set to the job to be output. Due to this, the postponement of the execution of automatic calibration is canceled.

At step 808, the control unit 101 executes the calibration requested to be executed.

By the above-described calibration control processing, the execution of automatic calibration is postponed in the case where it is determined that there is a user who is using the Media Direct Print function. Then, even in the case where it is determined that the Media Direct Print function is being used, the occurrence of a timeout error cancels the postponement of automatic calibration. That is, in the case where a user is away from the image forming apparatus for a certain time or more with a portable storage medium being attached, the postponement of the execution of automatic calibration is canceled, and therefore, the calibration that should be executed originally is prevented from being suppressed excessively by unnecessary postponement. Further, the postponement of the execution of automatic calibration is canceled based on the occurrence of a timeout error, and therefore, it is possible to apply the procedure to a product type not mounting a human sensor. That is, it is made possible to execute calibration in view of the timing at which a user does not use the apparatus without determining whether or not the user is using the apparatus by a human sensor.

In the above-described calibration control processing, control is performed so that the automatic calibration is executed immediately, for example, in the stage where it is determined that no portable storage medium is connected (No at step 802). However, it is desirable that the execution of automatic calibration be postponed similarly also, for example, in the case where a user is using the copy function. Because of this, it may also be possible to add, for example, a step of determining whether the Copy function key 211 on the operation panel is being selected by a user (see the portion surrounded by the broken line in FIG. 8) so that the postponement flag is set to the job in the case where a user is using the copy function. At step 806 in this case, it is also determined whether a predetermined time (for example, 10 minutes) elapses from the start of the above-described time count and during which there is no input of the operation of a user to the various kinds of screens or operation buttons displayed at the time of the use of the copy function.

As described above, according to the present embodiment, whether or not the postponement of the execution of calibration is necessary is determined based on not only whether or not a portable storage medium is connected but also whether the job in conflict with the execution of automatic calibration is a job accompanied by printing. Because of this, it is possible to suppress the postponement of the execution of automatic calibration to a bare minimum. As a result of that, improvement of usability can be expected while suppressing the magnitude of influence on deterioration of image quality to a slight level.

Second Embodiment

In the first embodiment, whether the possibility that the Media Direct Print function is used is strong is determined finally based on whether a document is set on the reading unit. In this case, there is a possibility that erroneous determination is performed in the case where another user who used the image forming apparatus immediately before left a document on the reading unit. Further, there may be a case where a document is copied with the USB memory being inserted. Because of this, an aspect is explained as a second embodiment, in which such a case can also be dealt with. Explanation of portions common to those of the first embodiment is simplified or omitted and here, only different points are explained mainly.

Figure 9:
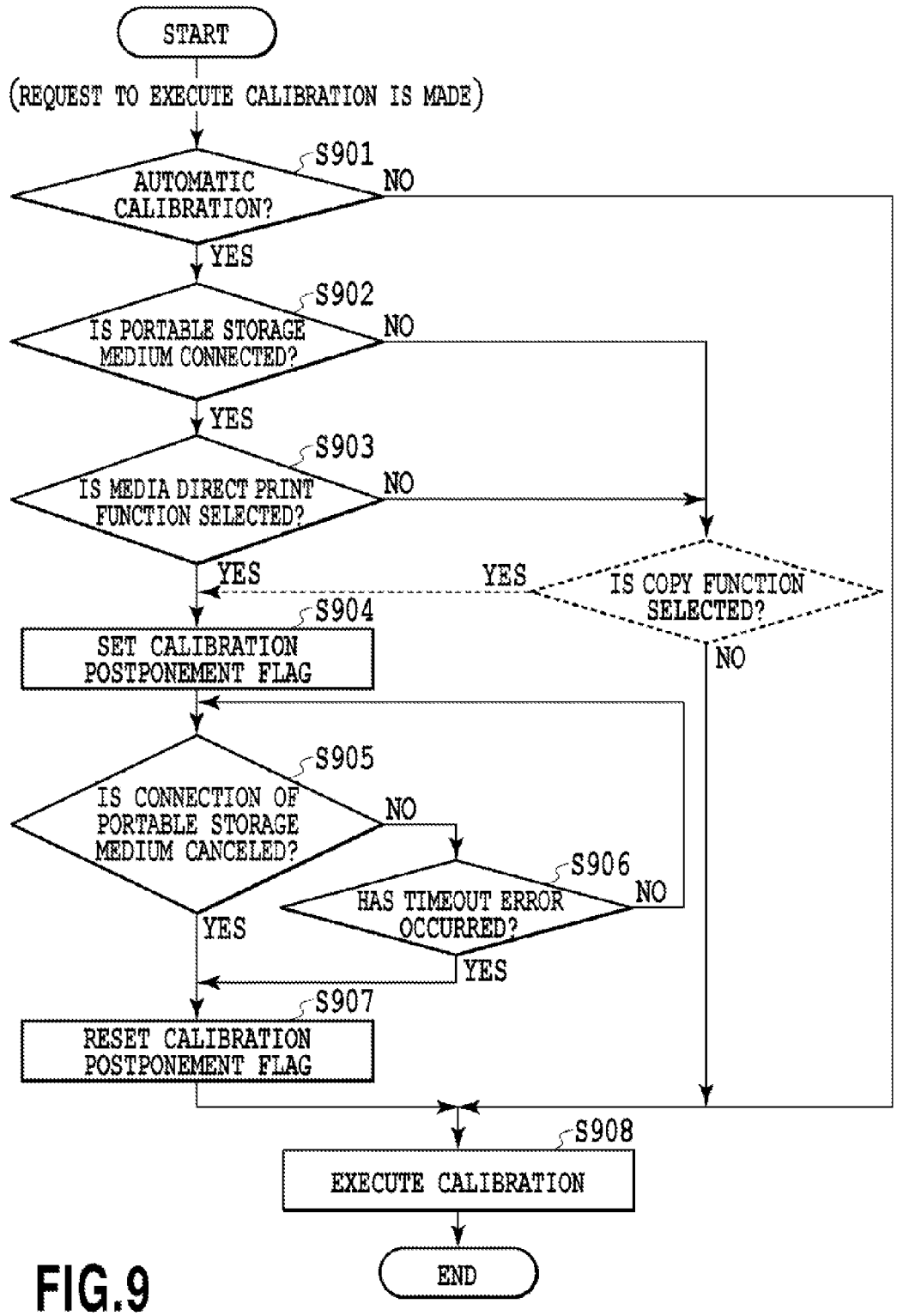
FIG. 9 is a flowchart showing a flow of calibration control processing according to a second embodiment.

FIG. 9 is a flowchart showing a flow of calibration control processing according to the present embodiment.

In the case where a request to execute calibration is made, at step 901, the control unit 101 determines whether the calibration requested to be executed is the automatic calibration or the manual calibration. In the case where the request is determined to be one to execute the automatic calibration, the procedure proceeds to step 902. On the other hand, in the case where the calibration is determined to be the manual calibration, the procedure proceeds to step 908 and the calibration is executed immediately.

At step 902, the control unit 101 determines whether a portable storage medium, such as a USB memory, is connected. In the case where a portable storage medium is connected, it is determined that there is a possibility that the Media Direct Print function is used and the procedure proceeds to step 903. On the other hand, in the case where no portable storage medium is connected, it is determined that there is no possibility that the Media Direct Print function is used, and the procedure proceeds to step 908 so that the calibration is executed immediately.

At step 903, the control unit 101 determines whether the Media Direct Print function accompanied by printing processing is being selected. Specifically, for example, whether the Media function key 214 is pressed is determined. In the case of the image forming apparatus having an operation unit having no independent function keys, such as those on the operation panel in FIG. 2 (for example, all user's inputs are received via a touch panel LCD), it is sufficient to perform determination based on the display state of its LUI screen etc. In the case where pressing of the Media function key 214 is detected, it is determined that the possibility that the Media Direct Print function is used continuously is strong and the procedure proceeds to step 904. On the other hand, in the case where pressing of the Media function key 214 is not detected, it is determined that the possibility that another function, such as the Scan To Media function, is used is strong and the procedure proceeds to step 908 so that the calibration is executed immediately.

At step 904, the control unit 101 sets a flag to postpone the execution of calibration to a job to be output and postpones the execution of calibration until any of the conditions, to be described later, is fulfilled.

At step 905, the control unit 101 determines whether the connection of the portable storage medium is canceled. In the case where the cancellation of the connection of the portable storage medium is detected, the procedure proceeds to step 907. On the other hand, in the case where the cancellation of the connection of the storage medium is not detected, the procedure proceeds to step 906.

At step 906, the control unit 101 determines whether a timeout error has occurred. In the case where a timeout error has occurred, the procedure proceeds to step 907. On the other hand, in the case where no timeout has occurred, the procedure returns to step 905.

At step 907, the control unit 101 resets the calibration postponement flag set to the job to be output.

At step 908, the control unit 101 executes the calibration requested to be executed.

As above, according to the present embodiment, while the Media Direct Print function accompanied by printing processing is being selected, the automatic calibration is controlled from being executed, and therefore, it is possible to avoid erroneous determination due to another user leaving a document as described previously. That is, it is made possible to more securely suppress the execution of automatic calibration while the Media Direct Print function is being used.

Third Embodiment

Next, an aspect is explained as a third embodiment, in which in the case where the insertion of a portable storage medium is detected while calibration is being executed, the execution of the calibration is canceled immediately and printing by the Media Direct Print function etc. is subjected to processing preferentially. Explanation of portions common to those of the first and second embodiments is simplified or omitted and here, different points are explained mainly.

Figure 10:
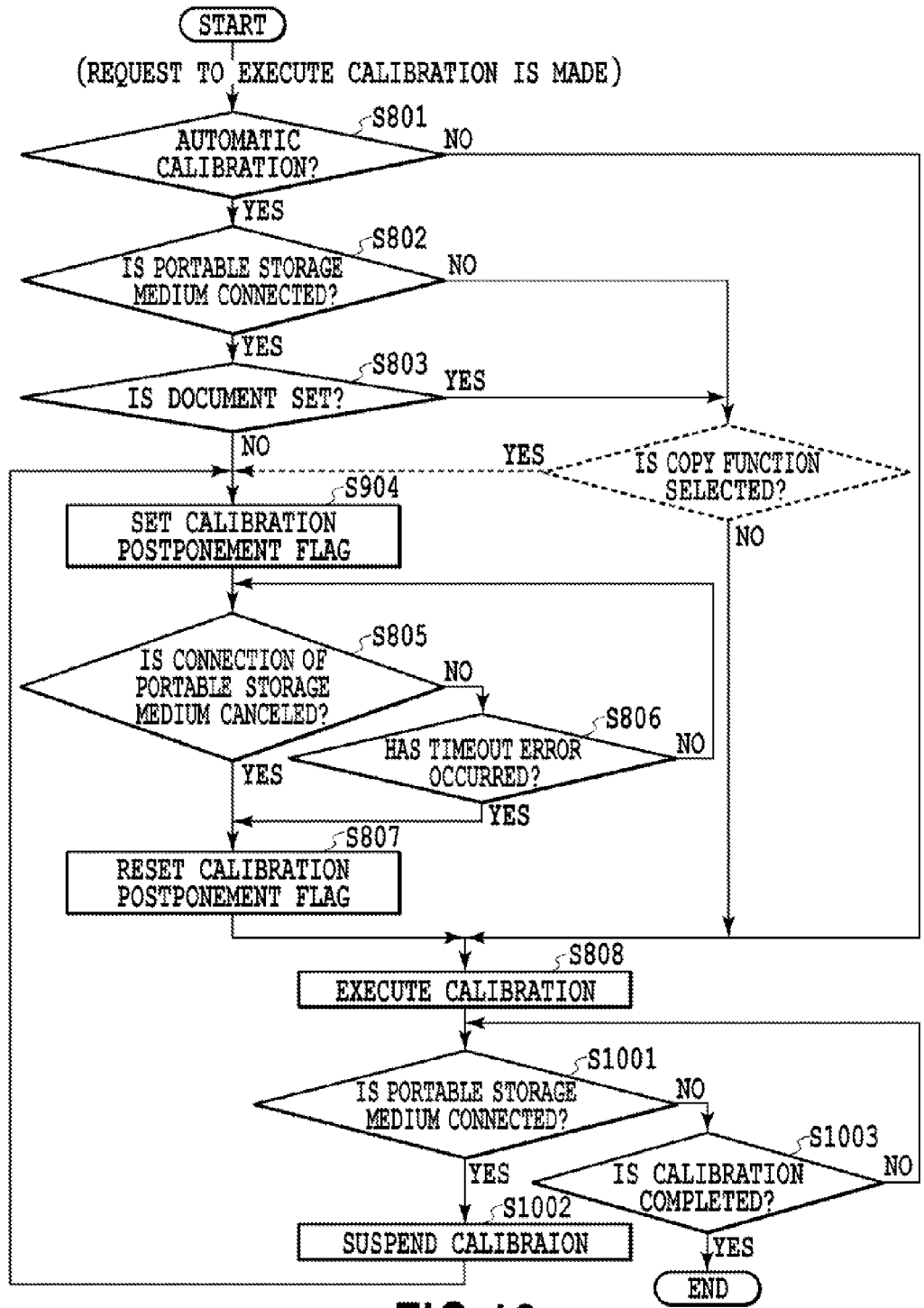
FIG. 10 is a flowchart showing a flow of calibration control processing according to a third embodiment.

FIG. 10 is a flowchart showing a flow of calibration control processing according to the present embodiment.

Steps 801 to 808 are the same as those explained in the flowchart in FIG. 8 according to the first embodiment.

At step 1001, the control unit 101 determines whether a portable storage medium, such as a USB memory, is connected. In the case where a portable storage medium is connected, the procedure proceeds to step 1002. On the other hand, in the case where no portable storage medium is connected, the procedure proceeds to step 1003.

At step 1002, the control unit 101 suspends the execution of calibration. After that, step 804 to step 808 are repeated. That is, a flag to postpone the execution of the suspended calibration is set (step 804). Then, the calibration postponement flag is reset (step 807) in accordance with whether or not the connection of the portable storage medium is canceled (step 805) and whether or not a timeout error has occurred (step 806), and the calibration is executed again (step 808).

At step 1003, the control unit 101 determines whether the execution of calibration is completed and in the case where the execution is not completed yet, the procedure returns to step 1001 and in the case where the execution is completed, the present processing is exited.

Here, explanation is given mainly based on the first embodiment, however, it may also be possible to incorporate the processing at step 1001 to step 1003 described above into the calibration control processing shown in the flowchart in FIG. 9 according to the second embodiment. Further, the function caused to interrupt the execution of calibration is not limited to the Media Direct Print function, and for example, it may also be possible to design the configuration so that, for example, other functions accompanied by printing processing, such as the copy function and the PC print function, can interrupt the execution of calibration.

As above, according to the present embodiment, the execution of calibration is suspended immediately at the time of, for example, the insertion of a portable storage medium while the calibration is being executed, and therefore, it is possible to further improve convenience of a user.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-270520, filed Dec. 11, 2012, which is hereby incorporated by reference herein in its entirety.

What is claimed is:

1. An image forming apparatus having Media Direct Print function to print data stored in a portable storage medium, the image forming apparatus comprising;
   a processor and a memory configured to function as:
   a connection detection unit configured to detect connection with the portable storage medium;
   a receiving unit configured to receive an execution request to execute calibration;
   a determining unit configured to determine whether the received execution request is made to execute manual calibration in response to instructions from a user or to execute automatic calibration on fulfillment of predetermined conditions;
   a calibration suspending unit configured to suspend execution of the calibration by not responding to the execution request, in response to the received execution request being determined by the determining unit as an execution request of the automatic calibration and the connection with the portable storage medium being detected by the connection detection unit; and
   a calibration execution unit configured to, in a case where the manual calibration is determined by the determining unit as the calibration requested to be executed, execute calibration by responding to the execution request to execute the calibration.

2. The image forming apparatus according to claim 1, further comprising a reading unit configured to read a document printed on a sheet set on the reading unit,
   wherein the calibration suspending unit suspends execution of the calibration in a case where the connection of the portable storage medium is detected by the connection detection unit and the document printed on the sheet is not on the reading unit.

3. The image forming apparatus according to claim 1, further comprising an operation unit configured to receive an input from a user,
   wherein the calibration suspending unit suspends execution of the calibration in a case where the connection of the portable storage medium is detected by the connection detection unit and a function accompanied by printing processing is selected by the operation unit.

4. The image forming apparatus according to claim 3, wherein the function accompanied by printing processing is the Media Direct Print function.

5. The image forming apparatus according to claim 1, wherein the calibration execution unit executes the suspended calibration in a case where cancellation of the connection of the portable storage medium is detected after suspending execution of the calibration with the calibration suspending unit.

6. The image forming apparatus according to claim 1, wherein the calibration execution unit executes the suspended calibration in a case where a timeout error has occurred after suspending execution of the calibration with the calibration suspending unit.

7. The image forming apparatus according to claim 1, wherein the calibration suspending unit suspends calibration being executed in response to the connection detection unit detecting the connection of the portable storage medium while the calibration is being executed.

8. The image forming apparatus according to claim 7, wherein the calibration execution unit executes the suspended calibration in a case where cancellation of the connection of the portable storage medium is detected by the connection detection unit after suspending execution of the calibration with the calibration suspending unit.

9. The image forming apparatus according to claim 7, wherein the calibration execution unit executes the suspended calibration in a case where a timeout error has occurred after suspending execution of the calibration with the calibration suspending unit.

10. An image forming apparatus comprising:
    a processor and a memory configured to function as:
    a log-in detection unit configured to detect that a user has logged in;
    a receiving unit configured to receive an execution request to execute calibration;
    a determining unit configured to determine whether the received execution request is made to execute manual calibration in response to instructions from a user or to execute automatic calibration on fulfillment of predetermined conditions;
    a calibration suspending unit configured to suspend execution of the calibration by not responding to the execution request, in response to the received execution request being determined by the determining unit as an execution request of the automatic calibration and the log-in being detected by the log-in detection unit; and
    a calibration execution unit configured to, in a case where the manual calibration is determined by the determining unit as the calibration requested to be executed, execute calibration by responding to the execution request to execute the calibration.

11. A control method of an image forming apparatus comprising Media Direct Print function to print data stored in a portable storage medium, the control method comprising the steps of:
    a connection detection step of detecting connection with the portable storage medium;
    receiving an execution request to execute calibration;
    a determining step of determining whether the received execution request is made to execute manual calibration in response to instructions from a user or to execute automatic calibration on fulfillment of predetermined conditions;

suspending execution of the calibration by not responding to the execution request, in response to the received execution request being determined in the determining step as an execution request of the automatic calibration and the connection with the portable storage medium being detected in the connection detection step; and executing calibration by responding to the execution request to execute the calibration, in a case where the manual calibration is determined in the determining step as the calibration requested to be executed.

12. A non-transitory computer readable storage medium storing a program for causing a computer to perform a control method of an image forming apparatus comprising Media Direct Print function to print data stored in a portable storage medium, the control method comprising the steps of:

a connection detection step of detecting connection with the portable storage medium;

receiving an execution request to execute calibration;

a determining step of determining whether the received execution request is made to execute manual calibration in response to instructions from a user or to execute automatic calibration on fulfillment of predetermined conditions;

suspending execution of the calibration by not responding to the execution request, in response to the received execution request being determined in the determining step as an execution request of the automatic calibration and the connection with the portable storage medium being detected in the connection detection step; and executing calibration by responding to the execution request to execute the calibration, in a case where the manual calibration is determined in the determining step as the calibration requested to be executed.

* * * * *